United States Patent
Ohki

(10) Patent No.: US 6,789,606 B2
(45) Date of Patent: Sep. 14, 2004

(54) FRONT CONSTRUCTION OF MOTOR VEHICLE BODY AND HEAT EXCHANGER SUPPORT FRAME USED THEREFOR

(75) Inventor: Kuniaki Ohki, Kanagawa (JP)

(73) Assignee: Calsonic Kansei Corporation, Tokyo (JP)

(*) Notice: Subject to any disclaimer, the term of this patent is extended or adjusted under 35 U.S.C. 154(b) by 172 days.

(21) Appl. No.: 10/255,673

(22) Filed: Sep. 27, 2002

(65) Prior Publication Data

US 2003/0062148 A1 Apr. 3, 2003

(30) Foreign Application Priority Data

Sep. 28, 2001 (JP) ........................................ 2001-300070

(51) Int. Cl.[7] .............................................. B60K 11/00
(52) U.S. Cl. .............................. 165/41; 165/76; 165/67; 180/68.1
(58) Field of Search ............................. 165/41, 42, 43, 165/44, 76, 67; 180/68.1, 68.4, 68.6

(56) References Cited

U.S. PATENT DOCUMENTS 5,123,695 A * 6/1992 Kanemitsu et al. ........ 180/68.4
5,269,264 A * 12/1993 Weinhold ................. 123/41.05
5,271,473 A * 12/1993 Ikeda et al. ................ 180/68.4
6,578,650 B2 * 6/2003 Ozawa et al. .............. 180/68.4

* cited by examiner

Primary Examiner—Ljiljana Ciric
(74) Attorney, Agent, or Firm—Foley & Lardner LLP

(57) ABSTRACT

A front construction of a motor vehicle body comprises a front base of the vehicle body and a heat exchanger support frame having an air passing aperture which is defined by upper and lower horizontal members and two mutually spaced side stays which extend between the upper and lower horizontal members. A skirt portion is integral with the lower horizontal member and extends along a lower portion of the lower horizontal member. The skirt portion faces forward with respect to the vehicle body keeping a given inclination relative to the heat exchanger support member to serve as an air guide for the air passing aperture. Recessed seat portions are integrally formed by the skirt portion, and fixing members are used for fixing the recessed seat portions to the front base.

14 Claims, 5 Drawing Sheets

FRONT CONSTRUCTION OF MOTOR VEHICLE BODY AND HEAT EXCHANGER SUPPORT FRAME USED THEREFOR

BACKGROUND OF INVENTION

1. Field of the Invention

The present invention relates in general to front constructions of motor vehicles, and more particularly to the front constructions of a type that is equipped with a heat exchanger support frame.

2. Description of the Related Art

Hitherto, to simplify the process for mounting heat exchangers, such as radiator, condenser and the like, onto a front base of motor vehicle body flowing on a vehicle body assembling line, a sub-assembly system has been widely employed. That is, in this system, before being mounted to the front base of motor vehicle body, the heat exchangers are mounted to a heat exchanger support frame to constitute a so-called "front end module", and then, the front end module is mounted to the front base of motor vehicle body flowing on the main assembling line.

One of known heat exchanger support frames is shaped rectangular and generally includes upper and lower horizontal members and right and left side stays or vertical members. In this known technique, for mounting the front end module, which has the heat exchangers previously mounted thereon, onto the front base of vehicle body, the side stays of the heat exchanger support frame are fixed to front ends of right and left side members of the front base by means of bolts and nuts respectively.

SUMMARY OF THE INVENTION

However, in the above-mentioned technique, because of necessity of assuring the mechanical strength and matching the size thereof with the front ends of the side members of the front base of vehicle body, the side stays of the heat exchanger support frame are compelled to have an enlarged width. This however means narrowing of an air passing aperture defined by the heat exchanger support frame, which of course affects the performance of the heat exchangers held by the support member.

It is therefore an object of the present invention to provide a front construction of a motor vehicle body, which is free of the above-mentioned drawback.

According to a first aspect of the present invention, there is provided a front construction of a motor vehicle body which comprises a front base of the vehicle body; a heat exchanger support frame having an air passing aperture which is defined by upper and lower horizontal members and two mutually spaced side stays which extend between the upper and lower horizontal members; a skirt portion integral with the lower horizontal member and extending along a lower portion of the lower horizontal member, the skirt portion facing forward with respect to the vehicle body keeping a given inclination relative to the heat exchanger support member to serve as an air guide for the air passing aperture; recessed seat portions integrally formed by the skirt portion; and fixing members which fix the recessed seat portions to the front base.

According to a second aspect of the present invention, there is provided a heat exchanger support frame which is to be mounted on a front base of vehicle body. The heat exchanger support frame comprises upper and lower horizontal members; two mutually spaced side stays which extend between the upper and lower horizontal members thereby to define a generally rectangular air passing aperture therebetween; a skirt portion integral with the lower horizontal member and extending along a lower portion of the same, the skirt portion facing forward keeping a given inclination relative to the heat exchanger support frame to serve as an air guide for the air passing aperture; and recessed seat portions integrally formed by the skirt portion, the recessed seat portions causing the skirt portion to have a three dimensional structure having an increased mechanical strength.

BRIEF DESCRIPTION OF THE DRAWINGS

Other objects and advantages of the present invention will become apparent from the following description when taken in conjunction with the accompanying drawings, in which.

DETAILED DESCRIPTION OF THE INVENTION

In the following, a front construction of a motor vehicle body according to the present invention will be described in detail with reference to the accompanying drawings.

For ease of understanding, various directional terms, such as right, left, upper, lower and rightward and the like are contained in the description. However, these terms are to be understood with respect to a drawing or drawings on which corresponding part or portion is shown.

Figure 1:
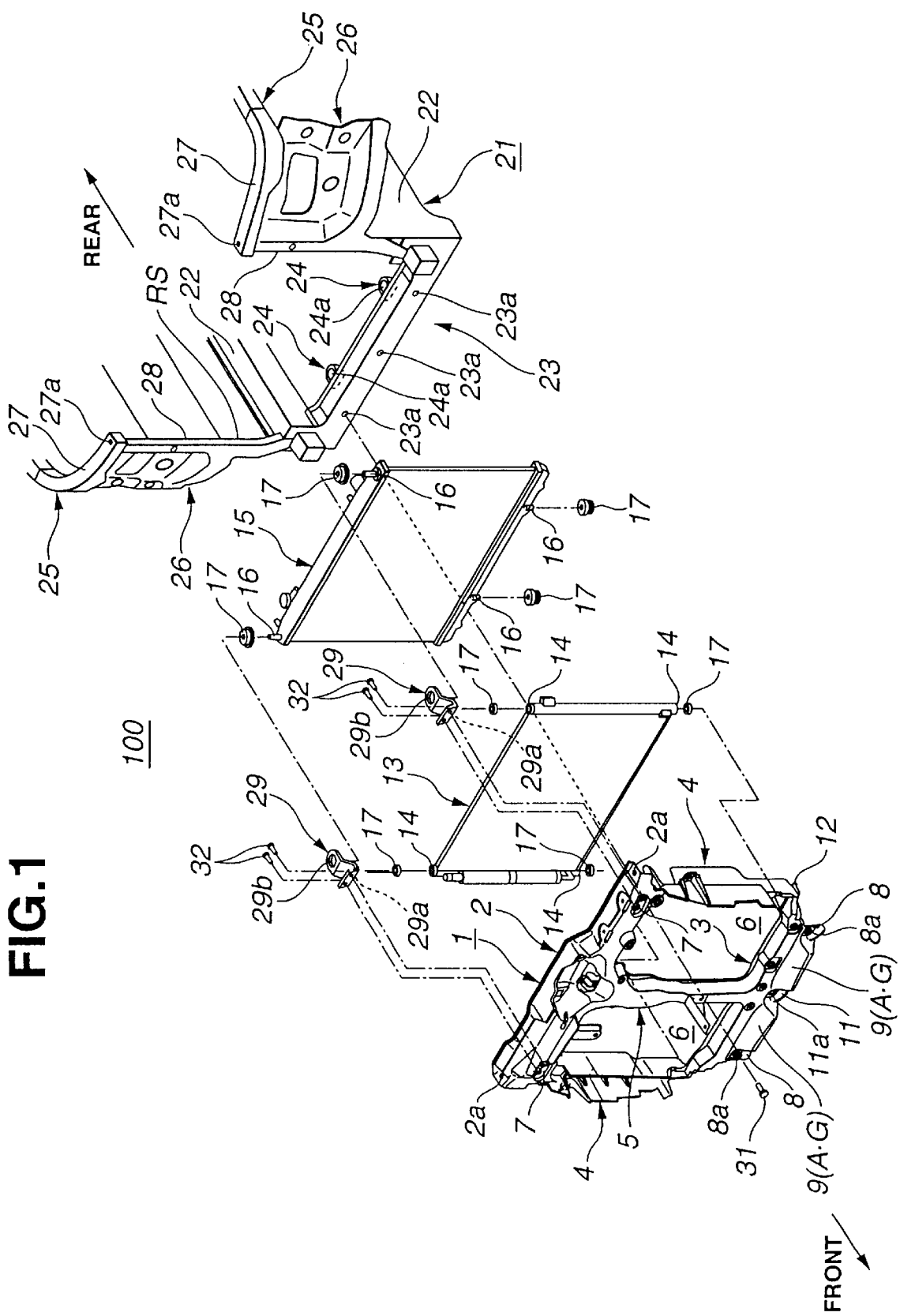
FIG. 1 is an exploded view of a front construction of a motor vehicle body, according to the present invention.

Referring to FIG. 1 of the drawings, there is shown in an exploded manner the front construction of the present invention, which is generally designated by numeral 100.

In the drawing, denoted by numeral 1 is a heat exchanger support frame which is to be mounted onto a front base 21 of a vehicle body.

First, the heat exchanger support frame 1 will be described in detail with reference to the drawings especially FIGS. 1 and 2.

The heat exchanger support frame 1 is of a molded plastics produced through an integral injection molding technique.

Figure 2:
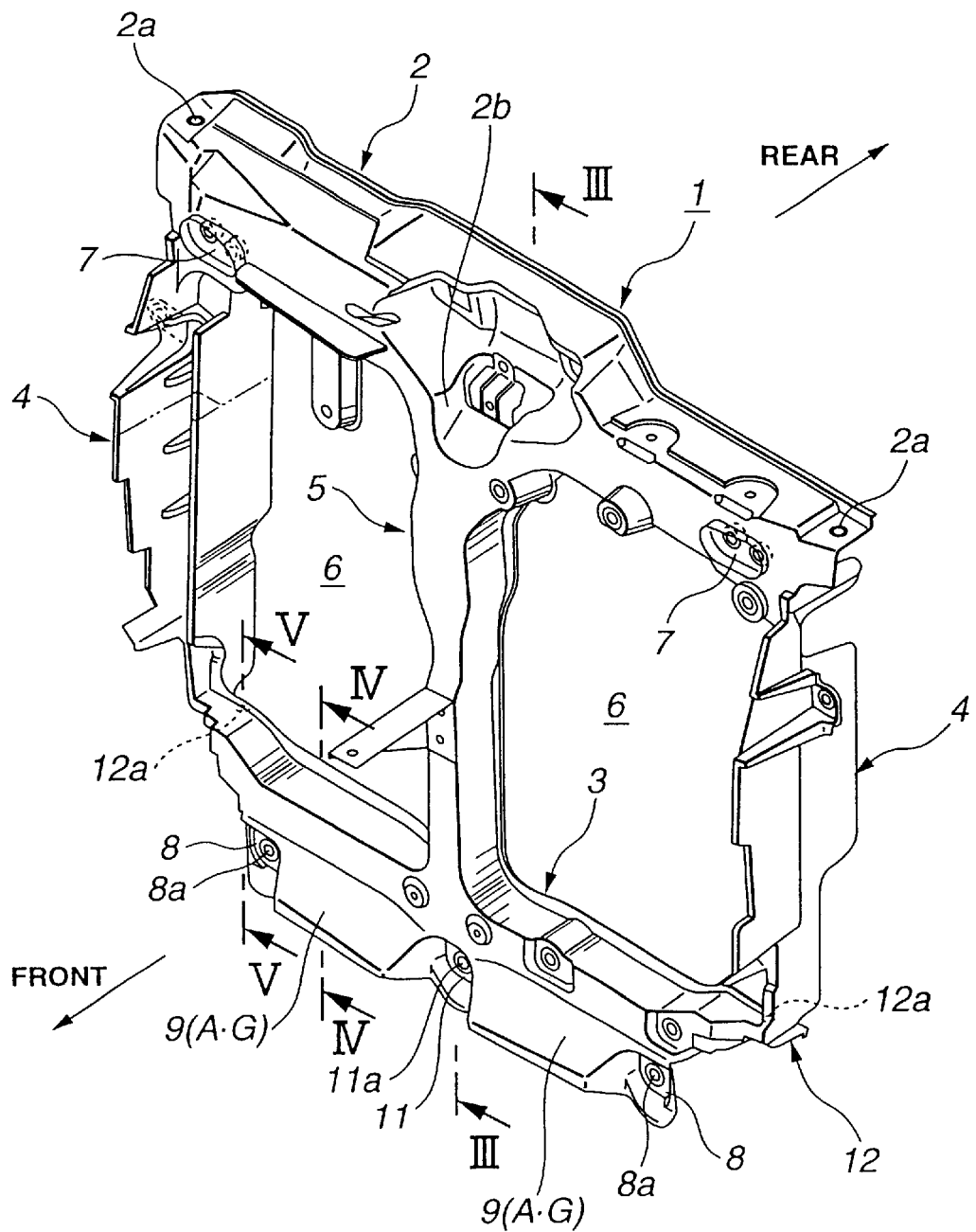
FIG. 2 is a perspective view of a heat exchanger support frame employed in the front construction of the present invention.

As is best shown in FIG. 2, the heat exchanger support frame 1 comprises upper and lower horizontal members 2 and 3 and right and left side stays 4 and 4 (or vertical members), each extending vertically between the upper and lower horizontal members 2 and 3. Furthermore, a center vertical member or hood lock stay 5 extends between a middle portion of the upper horizontal member 2 and that of the lower horizontal member 3.

It is to be noted that the terms "horizontal and vertical" used in this description and Claims do not indicate the exact meanings thereof. That is, such terms are used only for ease of understanding the construction of the parts mentioned in the description.

As shown in FIG. 2, the upper end of the hood lock stay 5, to which the middle portion of the upper horizontal member 2 is integrally connected, is formed with a recess 2b in which a known hood lock mechanism (not shown) is arranged.

With the above-mentioned construction, the heat exchanger support frame 1 has two, that is, right and left rectangular air passing apertures 6 and 6, the right aperture 6 being defined by right halves of the upper and lower horizontal members 2 and 3, the right side stay 4 and the hood lock stay 5, and the left aperture 6 being defined by left halves of the upper and lower horizontal members 2 and 3, the left side stay 4 and the hood lock stay 5.

As is shown in FIG. 2, the upper horizontal member 2 is formed at both ends thereof with respective bolt openings 2a and 2a each extending vertically. As will be described in detail hereinafter, these bolt openings 2a and 2a are used for fixing the heat exchanger support frame 1, namely, the upper horizontal member 2, to the front base 21 of vehicle body by means of bolts.

The upper horizontal member 2 has, at a front side thereof near the bolt openings 2a and 2a, respective recessed bracket seating portions 7 and 7 each facing horizontally.

The lower horizontal member 3 is formed at both ends thereof with recessed seat portions 8 and 8 respectively, each extending downward and having a bolt opening 8a which extends horizontally. More specifically, the seat portions 8 and 8 are integrally defined by a skirt portion 9 which extends along a lower portion of the lower horizontal member 3.

Figure 4:
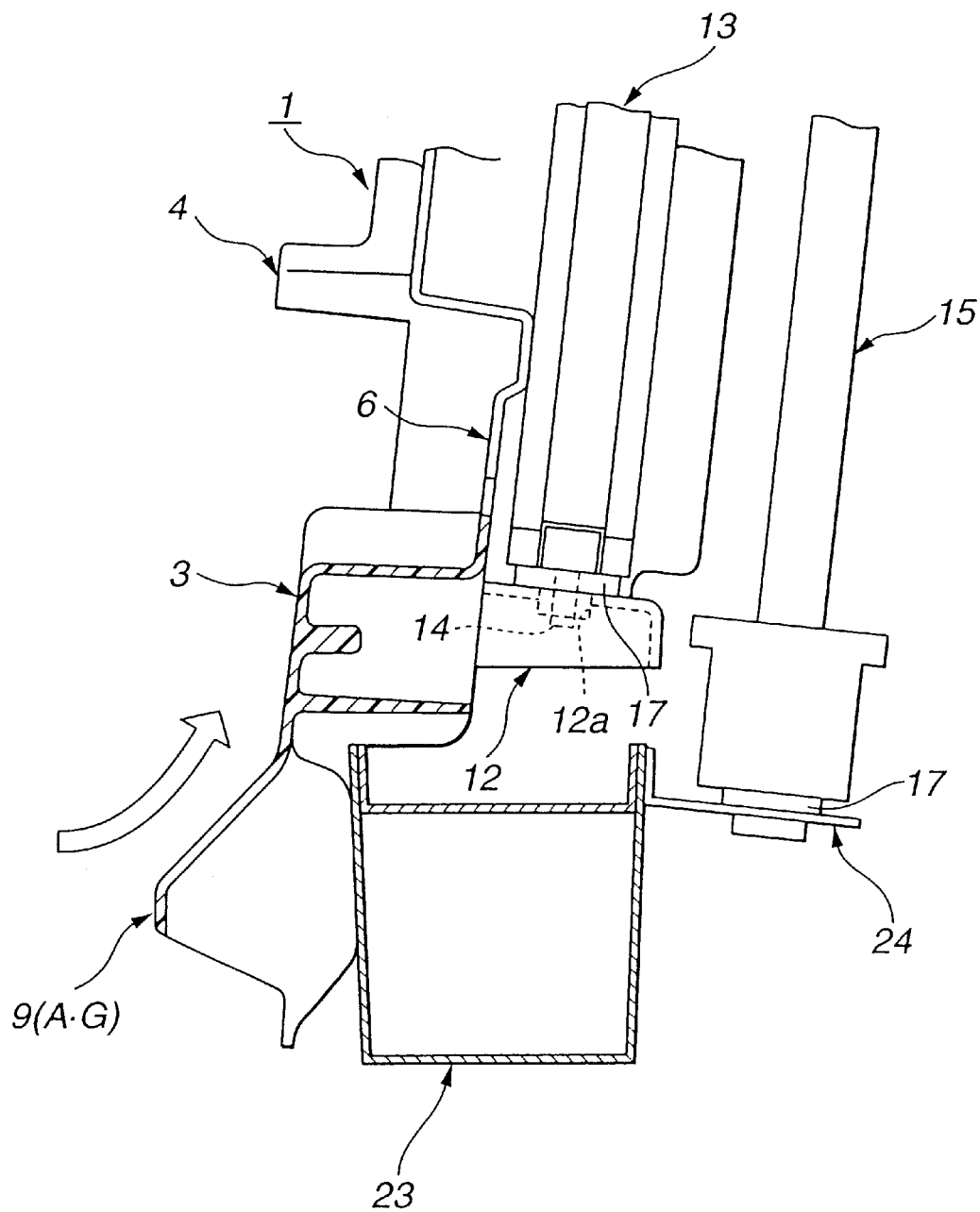
FIG. 4 is an enlarged sectional view taken along the line IV—IV of FIG. 2.
Figure 5:
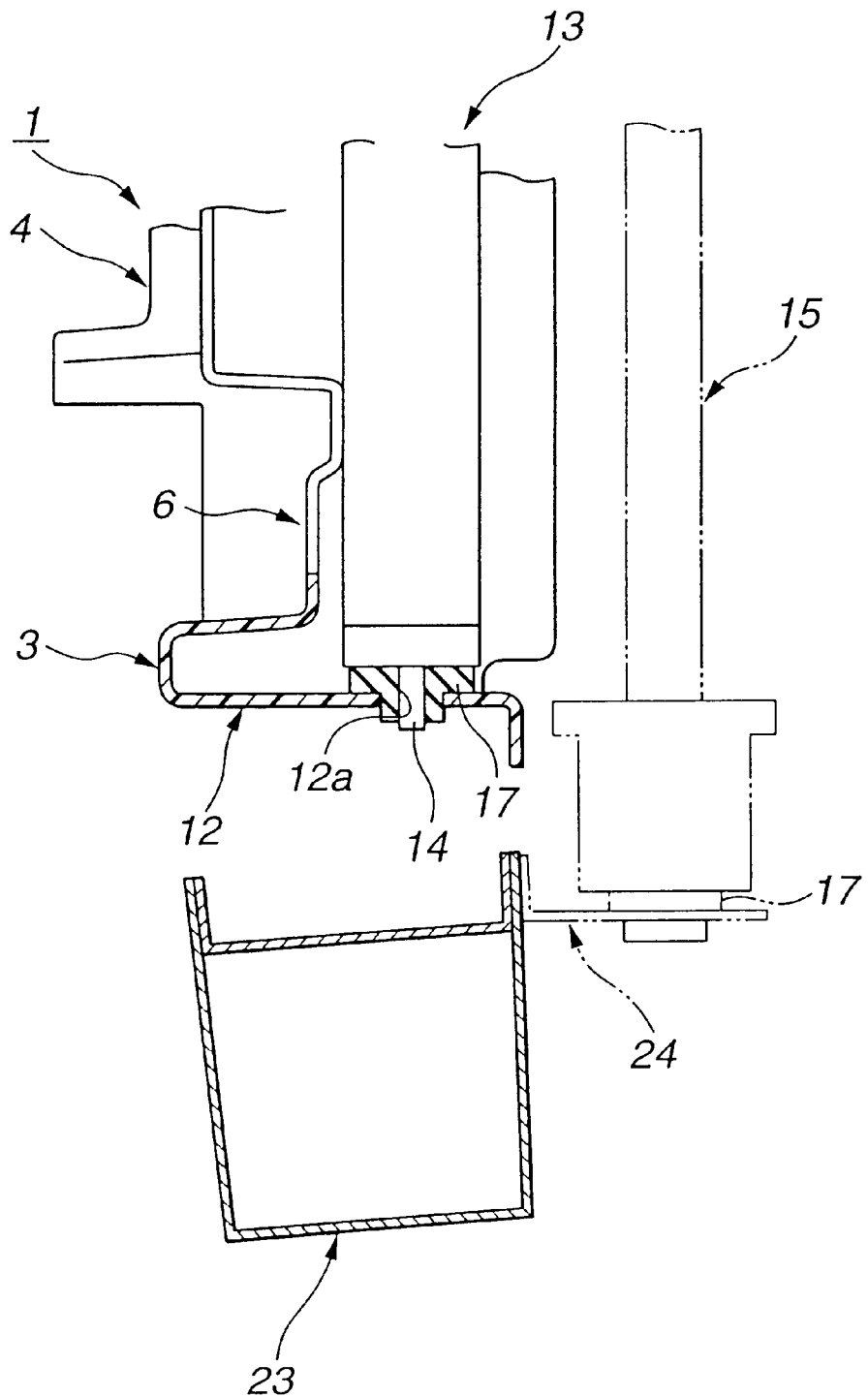
FIG. 5 is an enlarged sectional view taken along the line V—V of FIG. 2.

As is seen from FIG. 4, the skirt portion 9 is inclined or sloped relative to the lower horizontal member 3 so that the skirt portion 9 can serve as an air guide (A.G) for smoothly guiding outside air flow toward the two air passing apertures 6 and 6 as indicated by an arrow.

Referring back to FIG. 1, the lower end of the hood lock stay 5, to which a middle portion of the skirt portion 9 is integrally connected, is formed with a recessed seat portion 11 having a bolt opening 11a which extends horizontally. As will be described in detail hereinafter, the three bolt openings 8a, 8a and 11a are used for fixing the heat exchanger support frame 1, namely, the lower horizontal member 3, to the front base 21 of vehicle body by means of bolts.

As is seen from FIGS. 2 and 4, the lower horizontal member 3 is formed at both ends thereof with supporting steps 12 which extend rearward to support hereon a lower part of a rectangular condenser 13. Each supporting step 12 is formed with a catching opening 12a for receiving therein a supporting pin 14 extending from the condenser 13.

In the following, the front base 21 of vehicle body, to which the above-mentioned heat exchanger support frame 1 is fixed, will be described in detail with reference to the drawings.

Figure 3:
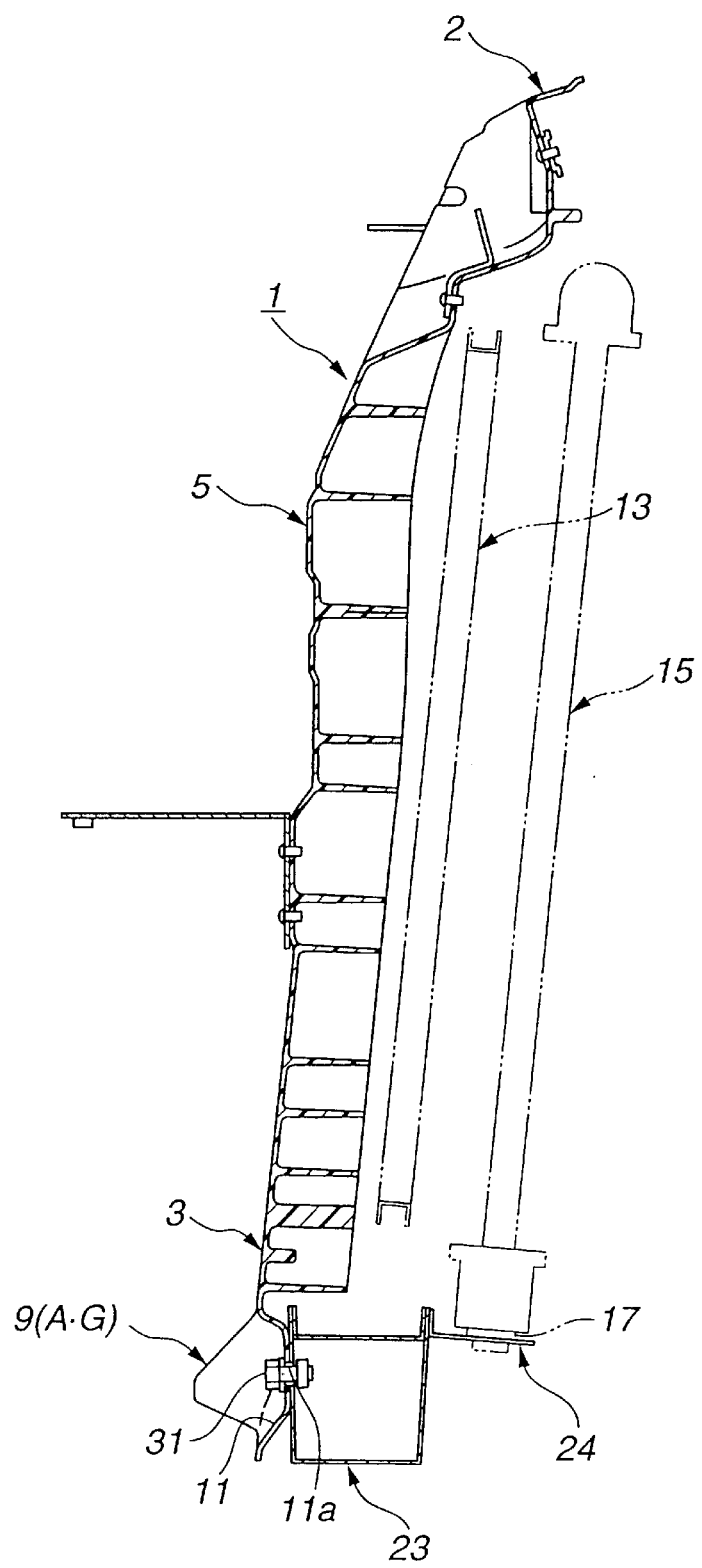
FIG. 3 is an enlarged sectional view taken along the line III—III of FIG. 2.

As is seen from FIG. 1, the front base 21 comprises right and left side members 22 and 22 which extend in a fore-and-aft direction with respect to the vehicle body. A front cross member 23 extends between front ends of the right and left side members 22 and 22, as shown. The front cross member 23 is of a channel structure as is seen from FIG. 3.

The front cross member 23 is formed at its front wall with three bolt openings 23a, 23a and 23a which are arranged to be mated with the above-mentioned bolt openings 8a, 8a and 11a of the lower horizontal member 3 of the heat exchanger support frame 1.

As is seen from FIGS. 1, 3, 4 and 5, the front cross member 23 is formed with two spaced brackets 24 and 24 which extend rearward for supporting thereon a lower part of a rectangular radiator 15. Each bracket 24 is formed with a catching opening 24a for receiving therein a supporting pin 16 extending from the radiator 15.

As is seen from FIG. 1, the front base 21 of vehicle body further comprises right and left hood ridge members 25 and 25 which are provided above the right and left side members 22 and 22. Between a front end of each hood ridge member 25 and the front cross member 23, there extends a lamp mounting panel 26. As shown, the two mounting panels 26 are spaced from each other to define therebetween a rectangular space RS that is used for neatly receiving therein a major portion of the rectangular heat exchanger support frame 1, as will be described in detail hereinafter.

Each lamp mounting panel 26 comprises an upper frame 27 connected to the front end of the hood ridge member 25 and a side frame 28 extending vertically between an inside leading end of the upper frame 27 and an end of the front cross member 23. The inside leading end of each upper frame 27 is formed with a bolt opening 27a.

Now, the condenser 13 and radiator 15 will be described in detail with reference to the drawings.

The condenser 13 is a heat exchanger installed in an air conditioning system, while the radiator 15 is a heat exchanger used for cooling engine cooling water.

As shown in FIG. 1, the rectangular condenser 13 is equipped at its four corners with supporting pins 14 respectively, each extending vertically, and the rectangular radiator 15 is equipped, at its upper two corners and portions near its lower two corners, with supporting pins 16 respectively, each extending vertically. The four supporting pins 14 of the condenser 13 and the four supporting pins 16 of the radiator 15 have respective insulators 17 disposed thereon. These insulators 17 are constructed of elastic members such as synthetic rubber or the like. With these insulators 17, the condenser 13 and the radiator 15 are elastically or resiliently supported by the heat exchanger support frame 1 and/or the front base 21 of vehicle body, as will become apparent hereinafter.

As shown in FIG. 1, two upper brackets 29 and 29 are used for holding upper portions of the condenser 13 and radiator 15. As will be described hereinafter, these two upper bracket 29 and 29 are to be secured to rear surfaces of the afore-mentioned bracket seating portions 7 and 7 (see FIG. 2) of the upper horizontal member 2 of the heat exchanger support frame 1. Each upper bracket 29 is formed with both a front catching opening 29a for receiving the upper supporting pin 14 of the condenser 13 and a rear catching opening 29b for receiving the upper pin 16 of the radiator 15.

In the following, steps for assembling the front construction of vehicle body will be described with reference to the drawings, especially FIG. 1.

First, only the heat exchanger support frame 1 is mounted to the front base 21 of vehicle body. That is, the heat exchanger support frame 1 is brought to the front base 21 to have both ends of the upper horizontal member 2 put on the upper frames 27 and 27 of the front base 21. Under this condition, the major portion of the heat exchanger support frame 1 is put in the rectangular space RS of the front base 21. Then, position adjustment is so made that the bolt openings 2a of the upper horizontal member 2 are mated with the bolt openings 27a of the upper frames 27 respectively, and the three bolt openings 8a, 8a and 11a of the lower horizontal member 3 are mated with the three bolt openings 23a, 23a and 23a of the front cross member 23 of the front base 21, respectively. Then, these five paired mated bolt openings (2a and 27a), (2a and 27A), (8a and 23a), (11a and 23a) and (8a and 23a) are tightly coupled by means of bolts and nuts 31 (see FIG. 3). With this, the heat exchanger support frame 1 is tightly mounted to the front base 21 of vehicle body having the major portion of the support frame 1 neatly received in the rectangular space RS of the front base 21.

Then, the condenser 13 and the radiator 15 are mounted to the heat exchanger support frame 1 in the following manner.

First, the condenser 13 is brought to a rear side of the heat exchanger support frame 1. Then, as is seen FIGS. 4 and 5, the condenser 13 is so handled that the two lower supporting pins 14 thereof are inserted into the catching openings 12a of the lower horizontal member 3 of the support frame 1. Then, the radiator 15 is brought to the rear side of the condenser 13 that is incompletely mounted to the support frame, and, then, as is seen from FIGS. 4 and 5, the radiator 15 is so handled that the two lower supporting pins 16 thereof are inserted into the catching openings 24a of the front cross member 23 of the front base 21 of vehicle body. Of course, before carrying out the above-mentioned steps, the insulators 17 are disposed on the respective supporting pins 14 and 16. With these steps, the condenser 13 and radiator 15 are temporarily mounted to the supporting steps 12 of the support frame 1 and the two brackets 24 of the front base 21 respectively.

Then, as is seen from FIG. 1, the two upper brackets 29 and 29 are brought to the temporarily assembled unit including the condenser 13 and radiator 15, and handled to have the upper supporting pins 14 and 16 of the condenser 13 and radiator 15 inserted into the catching openings 29a and 29b of the brackets 29 and 29. Of course, before carrying out these steps, the insulators 17 are disposed on the respective supporting pins 14 and 16. Then, the two upper brackets 29 and 29 are secured to the rear surfaces of the bracket seating portions 7 and 7 (see FIG. 2) of the upper horizontal member 2 of the heat exchanger support frame 1 by means of bolts and nuts 32. Thus, the condenser 13 and the radiator 15 are elastically or resiliently supported by the heat exchanger support frame 1, more specifically, by both the support frame 1 and the front cross member 23 of the front base 21 of vehicle body.

In the following, various advantageous features of the present invention will be described with respect to unique arrangements through which the advantages are obtained.

First, for fixing the heat exchanger support frame 1 to the front base 21 of vehicle body, the seat portions 8 and 8 which are provided at the lower side (viz., skirt portion 9) of the lower horizontal member 3 are used. This means that the two side stays 4 and 4 of the support frame 1 have no need of enlarging their width for the purpose of connection with the front base 21, and thus the two side stays 4 and 4 can be made narrow. Thus, the two rectangular air passing apertures 6 and 6 of the support frame 1 can have a sufficient size for taking air flow thereinto.

Second, between the seat portions 8 and 8, there extends the skirt portion 9 which faces forward and is inclined relative to the heat exchanger support member 1 to serve as air guide (A.G). Accordingly, as is seen from FIG. 4, under cruising of an associated motor vehicle, outside air is smoothly and effectively led into the two air passing apertures 6 and 6 as is indicated by the arrow.

Third, due to provision of the three recessed seat portions 8 and 8 and 11 which are spaced from one another, the skirt portion 9 has a three-dimensional structure and thus has an increased mechanical strength. This means an assured connection of the lower horizontal member 3 of the support frame 1 with the front base 21 of vehicle body. Furthermore, due to the same reason, the hood lock stay 5 whose lower end is integral with the middle recessed seat portion 11 has a robust structure and thus, the hood lock mechanism (not shown) mounted on the top of the hook lock stay 5 can exhibit a satisfied performance. That is, when, with a hood (not shown) kept locked by the hood lock mechanism, a certain pulling force is applied to the hook lock stay 5 from the hook lock stay 5, the force is assuredly received by the vehicle body through the middle recessed seat portion 11.

Fourth, the supporting steps 12 for supporting the lower end of the condenser 13 are located near the recessed seat portions 8 and 8 of the lower horizontal member 3, and upon mounting of the support frame 1 onto the front base 21 of vehicle body, the supporting steps 12 are positioned just above the front cross member 23 of the front base 21, as is seen from FIG. 4. This means that the mechanical strength or rigidity of the supporting steps 12 is increased bringing about a stable supporting of the condenser 13.

Fifth, headlamp units (not shown) are to be mounted to the lamp mounting panels 26 and 26. Thus, positioning of the headlamp units relative to the vehicle body is easily achieved as compared with an arrangement wherein the headlamp units are mounted to the heat exchanger support frame 1.

Sixth, due to provision of the rectangular space RS defined by the front base 21 of vehicle body, loading of various parts into an engine room is easily made.

In the above-mentioned assembling steps, mounting of the condenser 13 and radiator 15 onto the heat exchanger support frame 1 is made after the support frame 1 is fixed to the front base 21 of vehicle body. However, if desired, mounting of the condenser 13 and radiator 15 onto the support frame 1 may be made before the support frame 1 is fixed to the front base 21. That is, in this case, a so-called front end module is produced by the support frame 1, the condenser 13 and the radiator 15 in advance.

The entire contents of Japanese Patent Application 2001-300070 filed Sep. 28, 2001 are incorporated herein by reference.

Although the invention has been described above with reference to the embodiment of the invention, the invention is not limited to such embodiment as described above. Various modifications and variations of such embodiment may be carried out by those skilled in the art, in light of the above description.

What is claimed is:

1. A front construction of a motor vehicle body comprising:
   a front base of the vehicle body;
   a heat exchanger support frame having an air passing aperture which is defined by upper and lower horizontal members and two mutually spaced side stays which extend between the upper and lower horizontal members;
   a skirt portion integral with the lower horizontal member and extending along a lower portion of the lower horizontal member, the skirt portion facing forward with respect to the vehicle body keeping a given inclination relative to the heat exchanger support member to serve as an air guide for the air passing aperture;
   recessed seat portions integrally formed by the skirt portion; and
   fixing members which fix the recessed seat portions to the front base.

2. A front construction as claimed in claim 1, in which the heat exchanger support frame further has a hood lock stay which extends between a middle portion of the upper horizontal member and that of the lower horizontal member, a lower end of the hood lock stay being integrally connected to the skirt portion through one of the recessed seat portions.

3. A front construction as claimed in claim 1, in which the lower horizontal member of the heat exchanger support frame is formed at both end portions thereof with supporting steps which project rearward to support thereon a lower end of a heat exchanger, each supporting step having a catching opening into which a supporting pin projected downwardly from the heat exchanger is inserted.

4. A front construction as claimed in claim 3, in which in which the supporting steps are placed in the vicinity of the recessed seat portions.

5. A front construction as claimed in claim 1, in which the front base of the vehicle body comprises:

side members which are spaced from each other;

a front cross member extending between front ends of the side members;

hood ridge members positioned above the side members respectively;

upper frames connected to front ends of the hood ridge members and extending toward each other; and side frames each extending between the front cross member and one of the upper frames; and lamp mounting panels respectively connected to the side frames.

6. A front construction as claimed in claim 5, in which longitudinal ends of the upper horizontal member of the heat exchanger support frame are secured to the upper frames of the front base respectively, and in which the recessed seat portions of the lower horizontal member of the heat exchanger support frame are secured to the front cross member of the front base through the fixing members.

7. A front construction as claimed in claim 6, in which the front cross member of the front base is equipped with mutually spaced brackets for supporting thereon a lower end of another heat exchanger.

8. A front construction as claimed in claim 7, in which each of the spaced brackets is formed with a catching opening into which a supporting pin projected downwardly from the another heat exchanger is inserted.

9. A front construction as claimed in claim 8, further comprising an upper fixing structure through which upper end portions of the two heat exchangers are connected to the upper horizontal member of the heat exchanger support frame.

10. A front construction as claimed in claim 9, in which the upper fixing structure comprises:

first two upper supporting pins projected upward from one of the two heat exchangers;

second two upper supporting pins projected upward from the other of the two heat exchangers; and two upper brackets which are secured to spaced portions of the upper horizontal member of the heat exchanger support frame, each upper bracket having a first catching opening into which one of the first two upper supporting pins is inserted and a second catching opening into which one of the second two upper supporting pins is inserted.

11. A front construction as claimed in claim 10, further comprising insulators which are disposed on the supporting pins respectively to resiliently support the two heat exchangers relative to the heat exchanger support frame and the front base.

12. A heat exchanger support frame to be mounted on a front base of vehicle body, comprising:

upper and lower horizontal members;

two mutually spaced side stays which extend between the upper and lower horizontal members thereby to define a generally rectangular air passing aperture therebetween;

a skirt portion integral with the lower horizontal member and extending along a lower portion of the same, the skirt portion facing forward keeping a given inclination relative to the heat exchanger support frame to serve as an air guide for the air passing aperture; and recessed seat portions integrally formed by the skirt portion, the recessed seat portions causing the skirt portion to have a three dimensional structure having an increased mechanical strength.

13. A heat exchanger support frame as claimed in claim 12, further comprising a hood lock stay which extends between a middle portion of the upper horizontal member and that of the lower horizontal member, a lower end of the hood lock stay being integrally connected to the skirt portion through one of the recessed seat portions.

14. A heat exchanger support frame as claimed in claim 12, in which the lower horizontal member is formed at both end portions thereof with supporting steps which project rearward, the supporting steps being placed in the vicinity of the recessed seat portions.

* * * * *